United States Patent
Suzuki (10) Patent No.: US 11,775,792 B2
(45) Date of Patent: Oct. 3, 2023

(54) IMAGE FORMING APPARATUS

(71) Applicant: TOSHIBA TEC KABUSHIKI KAISHA, Tokyo (JP)

(72) Inventor: Katsunori Suzuki, Mishima (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 17/199,704

(22) Filed: Mar. 12, 2021

(65) Prior Publication Data
US 2022/0292320 A1    Sep. 15, 2022

(51) Int. Cl.
*G06K 15/00* (2006.01)
*G06K 15/02* (2006.01)

(52) U.S. Cl.
CPC ..... *G06K 15/1886* (2013.01); *G06K 15/1868* (2013.01); *G06K 15/4065* (2013.01)

(58) Field of Classification Search
None
See application file for complete search history.

(56) References Cited

U.S. PATENT DOCUMENTS

| 9,487,042 | B2 | 11/2016 | Hiyoshi | |
| 2018/0239289 | A1* | 8/2018 | Takada | G03G 15/5062 |
| 2021/0234976 | A1* | 7/2021 | Oishi | H04N 1/00342 |

FOREIGN PATENT DOCUMENTS

| JP | 2007-043454 | 2/2007 |
| JP | 2007-158428 | 6/2007 |

* cited by examiner

*Primary Examiner* — Dov Popovici
(74) *Attorney, Agent, or Firm* — FOLEY & LARDNER LLP (57) ABSTRACT

According to at least one embodiment, an image forming apparatus includes a processor configured to cause forming an image with a decolorable color material on a tagged paper sheet with an RFID tag, reading data of the RFID tag attached to the tagged paper sheet before the image is formed, and promoting information related to reuse of the tagged paper sheet based on the data read from the RFID tag before the image is formed on the tagged paper sheet.

20 Claims, 8 Drawing Sheets

- IMAGE FORMING SECTION — 1211
- READING SECTION — 1212
- PROMOTING SECTION — 1213
- WRITING SECTION — 1214
- DESIGNATION SECTION — 1215
- ACQUISITION SECTION — 1216

| TAG ID | RFID TAG IDENTIFICATION INFORMATION |
|---|---|
| DECOLORING INFORMATION | NUMBER OF TIMES OF DECOLORING FOR EACH DECOLORING AREA OR LIKE |
| RFID INFORMATION | RFID TAG POSITION INFORMATION OR LIKE |
| PAPER SHEET INFORMATION | PRINTING SURFACE INFORMATION OR LIKE |

IMAGE FORMING APPARATUS

FIELD

Exemplary embodiments described herein relate to an image forming apparatus.

BACKGROUND

An image forming apparatus may have an image formed on a tagged paper sheet to which a radio frequency identification (RFID) tag is attached and data is written into the RFID tag of the tagged paper sheet. This type of image forming apparatus is suitable for applications such as printing information that should be viewed as an image on the tagged paper sheet and writing information that should not be viewed as digital data into the RFID tag.

The tagged paper sheet is considerably more expensive than a plain paper sheet. Therefore, a user desires reuse of the tagged paper sheet. In general, the data can be rewritten into the RFID tag. An image forming apparatus that enables reuse of a paper sheet is known by forming an image on the paper sheet with a color material such as decolorable toner or ink. Here, by developing an image forming apparatus that prints an image on a tagged paper sheet using a decolorable color material and writes data into the RFID tag of the tagged paper sheet, it is possible to reuse the tagged paper sheet.

When reusing a tagged paper sheet, there are restrictions. For example, there is an upper limit to the number of decoloring times because the paper sheet deteriorates due to repeated decoloring. Since an RFID tag is attached to the paper sheet, the printable surface may be limited. Depending on the position of the RFID tag, post-treatment such as saddle stitching and tri-folding is not possible. Even when an attempt is made to reuse the tagged paper sheet while ignoring such restrictions, there is a concern that printing errors occur and the cost increases.

DETAILED DESCRIPTION

According to at least one embodiment, an image forming apparatus includes an image forming section, a reading section, and a promoting section. The image forming section forms an image with a decolorable color material on a tagged paper sheet with an RFID tag. The reading section reads data from the RFID tag attached to the tagged paper sheet before the image is formed by the image forming section. The promoting section promotes information related to reuse of the tagged paper sheet based on the data read from the RFID tag before the image is formed on the tagged paper sheet.

Examples of such an image forming apparatus include a copying machine, a printer, a facsimile machine, a multifunction device, and the like. A multifunction device is an office device that combines at least two functions of each function from a copying machine, a printer, a facsimile machine, an image scanner, and the like. In at least one embodiment, the multifunction device is used as an example of the image forming apparatus.

Figure 1:
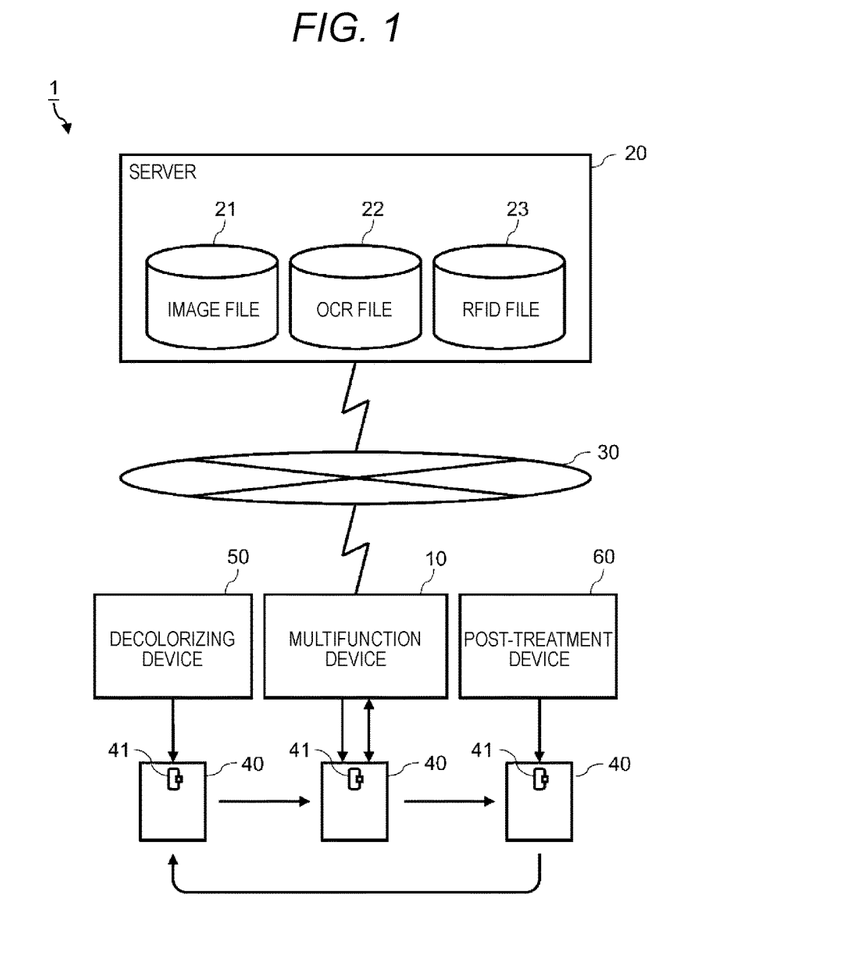
FIG. 1 is a schematic configuration view of an image forming system, according to at least one embodiment.

FIG. 1 is a schematic configuration view of an image forming system 1 according to at least one embodiment. The image forming system includes a multifunction device 10 which is an example of an image forming apparatus, a server 20, and a communication network 30. The multifunction device 10 is connected to the server 20 via the communication network 30.

The server 20 is a cloud server which is constructed on the cloud and provides a cloud service (server runs in a cloud environment) to the multifunction device 10. The server 20 includes a database that stores an image file 21, an optical character reader (OCR) file 22, and an RFID file 23, respectively. The image file 21 is a data file that stores image data for printing. The OCR file 22 is a data file that stores digital data after performing character recognition processing with respect to the image data. The RFID file 23 is a data file that stores data written into a RFID tag. As one of the cloud services, the server 20 provides the data of the image file 21, the OCR file 22, or the RFID file 23 to the multifunction device 10 via the communication network 30.

The communication network 30 is typically the Internet. The communication network 30 may include a local area network (LAN). The communication network 30 may be a computer network other than the Internet.

The multifunction device 10 has a function of printing image data on a tagged paper sheet 40 to which an RFID tag 41 is attached and a function of writing data into the RFID tag 41 attached to the tagged paper sheet 40. The multifunction device 10 prints an image on a paper sheet 40 with an RFID tag using decolorable toner which is a decolorable color material. The decolorable color material includes a coloring compound, a coloring agent, a decolorable agent, and the like. Examples of the coloring compound include a leuco dye. Examples of the coloring agent include phenols. Examples of the decolorable agent include substances that are compatible with the coloring compound when heated and do not have affinity for the coloring agent. The decolorable color material develops color by the interaction between the coloring compound and the coloring agent. The decolorable color material is decolored when the interaction between the coloring compound and the coloring agent is cut off by heating at a decoloring temperature or higher.

The image forming system 1 includes a decoloring device 50 and a post-treatment device 60 as peripheral devices of the multifunction device 10. The decoloring device 50 decolors an image by heating a paper sheet on which an image is formed by a decolorable color material at a decoloring temperature or higher. The post-treatment device 60 performs post-treatment with respect to the paper sheet on which the image is formed by the multifunction device 10.

The post-treatment includes, for example, stapling, punching, saddle stitching, Z-folding, tri-folding, and the like.

The image forming system 1 having such a configuration can reuse the tagged paper sheet 40. In other words, the multifunction device 10 prints an image on the tagged paper sheet 40 with a decolorable color material based on the image data of the image file 21 provided from the server 20. The multifunction device 10 overwrites the digital data of the OCR file 22 provided from the server 20 or the writing data of the RFID file 23, on the RFID tag 41 attached to the tagged paper sheet 40. The post-treatment device 60 performs post-treatment with respect to the tagged paper sheet 40 treated by the multifunction device 10. The decoloring device 50 decolors the image printed on the tagged paper sheet 40 with a decolorable color material. The tagged paper sheet 40 in which the image is decolored can be reused in the multifunction device 10.

When post-treatment is not required for the tagged paper sheet 40, the post-treatment device 60 can be removed from the image forming system 1. When the multifunction device 10 has a function of decoloring the image printed on the tagged paper sheet 40 with a decolorable color material, the decoloring device 50 can be removed from the image forming system 1.

Figure 2:
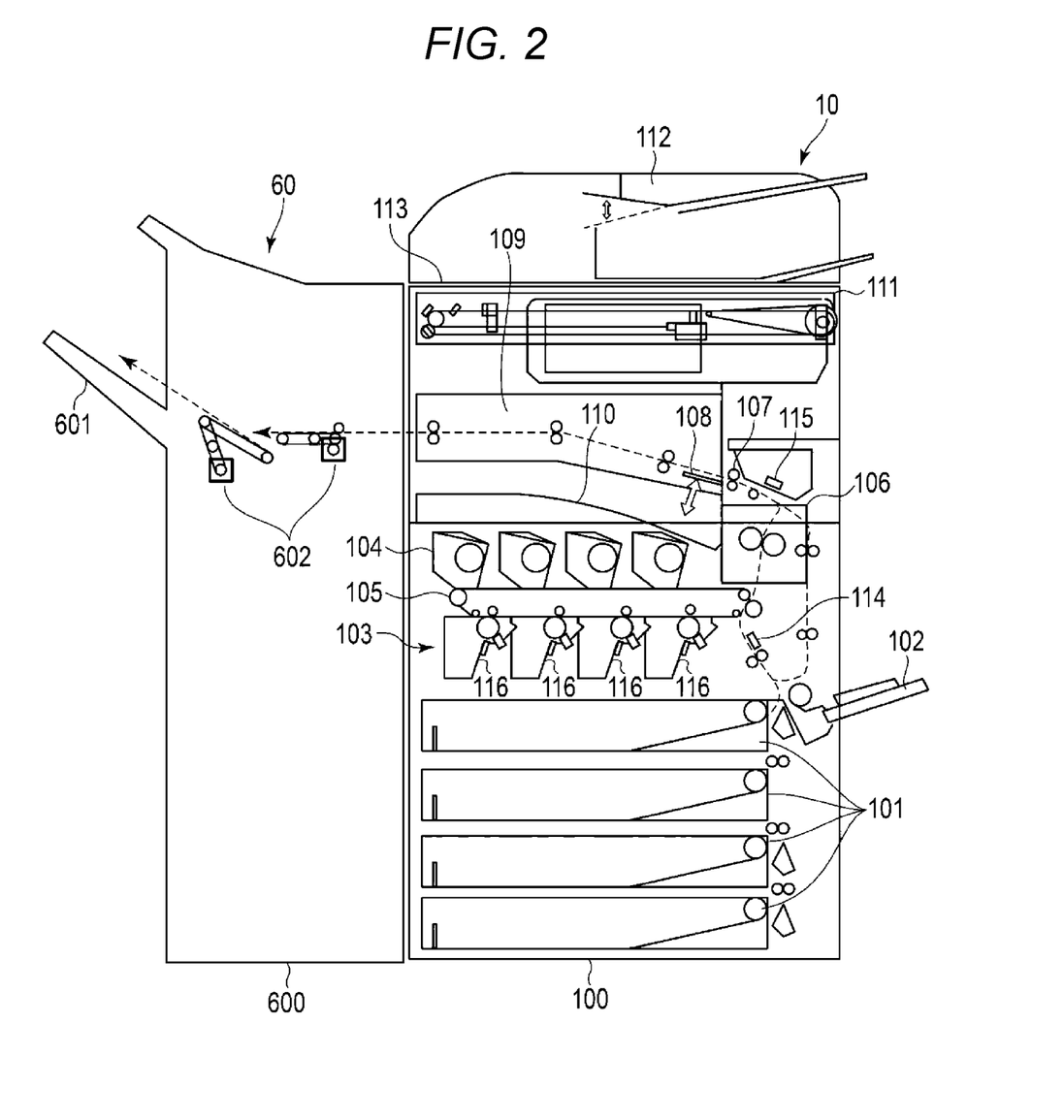
FIG. 2 is a schematic view illustrating a main configuration of a multifunction device, according to at least one embodiment.

FIG. 2 is a schematic view illustrating a main configuration of the multifunction device 10. FIG. 2 illustrates a state where the multifunction device 10 is equipped with the post-treatment device 60. The multifunction device 10 and the post-treatment device 60 can be attached and detached to and from each other.

The multifunction device 10 includes a housing 100. The housing 100 accommodates a paper feed cassette 101, a manual feed tray 102, an image forming unit 103 (e.g., an image forming device), a toner cartridge 104, a transfer unit 105 (e.g., a transfer device), a fixing unit 106 (e.g., a fixing device), a paper discharge roller 107, a conveyance path switching gate 108, a relay unit 109 (e.g., a relay device), a paper discharge tray 110, and a scanner 111, an automatic document feeding device 112, a control panel 113, a first reader/writer 114, and a second reader/writer 115.

The paper feed cassette 101 and the manual feed tray 102 accommodate a sheet-shaped printing medium. The printing medium includes the tagged paper sheet 40 with the RFID tag 41 and a plain paper sheet without an RFID tag.

In the multifunction device 10 illustrated in FIG. 2, the paper feed cassette 101 has a four-stage configuration. The user of the multifunction device 10 uses, for example, any one-stage paper feed cassette 101 as a cassette dedicated to the tagged paper sheet. The user may use two or more stages of paper feed cassettes 101 as a cassette dedicated to the tagged paper sheet. The user may feed the tagged paper sheet 40 from the manual feed tray 102.

The image forming unit 103 includes a plurality of process units 116 (e.g., process device). Each process unit 116 is a unit for forming a toner image. Each process unit 116 is provided for each type of toner. One process unit 116 corresponds to a decolorable toner. Other process units 116 correspond to a non-decolorable toner. The decolorable toner and the non-decolorable toner are supplied from the toner cartridge 104 corresponding to each process unit 116.

The multifunction device 10 illustrated in FIG. 2 includes four process units 116. The number of process units 116 is not limited to four. At least the process unit 116 corresponding to the decolorable toner and the process unit 116 corresponding to the non-decolorable toner is required.

The process unit 116 includes a photosensitive drum, a cleaner, an electrostatic charger, an exposure head and a developing device. The photosensitive drum is a photosensitive body including a cylindrical drum and a photosensitive layer formed on an outer peripheral surface of a drum. The photosensitive drum is rotated at a constant speed by the power transmitted from a driving mechanism.

The cleaner includes a blade that comes into contact with the surface of the photosensitive drum. The cleaner removes the toner remaining on the surface of the photosensitive drum using the blade.

The electrostatic charger is a device that uniformly charges the surface of the photosensitive drum. For example, the electrostatic charger charges the photosensitive drum to a uniform negative electrode potential by applying a grid bias voltage output from the grid electrodes to the photosensitive drum.

The exposure head includes a plurality of light emitting elements. The light emitting element is, for example, a laser diode (LD), a light emitting diode (LED), an organic EL (OLED), or the like. The plurality of light emitting elements are arranged in a main scanning direction which is a direction parallel to a rotational shaft of the photosensitive drum. Each light emitting element is configured to emit light to one point on the photosensitive drum. The exposure head forms a latent image for one line on the photosensitive drum by irradiating the surface of the charged photosensitive drum with light from a plurality of light emitting elements arranged in the main scanning direction. The exposure head forms a plurality of lines of latent images by continuously irradiating the rotating photosensitive drum with the light.

A developing device is a device that makes toner adhere to the photosensitive drum to form a toner image on the photosensitive drum. The developing device includes a developer container, a stirring mechanism, a developing roller, a doctor blade, and the like. The developer container is a container that contains a developer including a toner and a carrier. The developer container receives the toner delivered from the toner cartridge 104 by a toner delivery mechanism. The carrier is accommodated in the developer container during the manufacture of the developing device. The stirring mechanism stirs the toner and the carrier in the developer container. The developing roller makes the developer adhere to the surface of the roller by rotating in the developer container. The doctor blade is a member disposed at a predetermined distance from the surface of the developing roller. The doctor blade removes a part of the developer adhering to the surface of the rotating developing roller. Accordingly, the developer layer having a thickness corresponding to the distance between the doctor blade and the surface of the developing roller is formed on the surface of the developing roller.

As described above, when the surface of the photosensitive drum charged by the electrostatic charger is irradiated with light from the exposure head, a latent image is formed. Next, when the developer layer formed on the surface of the developing roller in the developing device approaches the surface of the photosensitive drum, the toner contained in the developer adheres to the latent image formed on the surface of the photosensitive drum. Accordingly, a toner image is formed on the surface of the photosensitive drum.

The plurality of toner cartridges 104 that respectively correspond to each process unit 116 of the image forming unit 103 include a toner container and a toner delivery mechanism. The toner container is a container for containing toner. The toner delivery mechanism is a mechanism that delivers the toner in the toner container to the developing device of the image forming unit 103.

The transfer unit 105 is a unit for transferring the toner image formed on the surface of the photosensitive drum by each process unit 116 to the printing medium. The transfer unit includes, for example, a transfer belt, a secondary transfer counter roller, a plurality of primary transfer rollers, and a secondary transfer roller.

The transfer belt is an endless belt wound around a secondary transfer counter roller and a plurality of winding rollers. In the transfer belt, the back surface, which is the inner surface, comes into contact with the secondary transfer counter roller and the plurality of winding rollers, and the surface, which is the outer surface, opposes the photosensitive drums of each process unit 116.

The secondary transfer counter roller conveys the transfer belt by rotating with the power transmitted from the driving mechanism.

A plurality of primary transfer rollers are provided for each process unit 116. The plurality of primary transfer rollers are provided to oppose the photosensitive drums of the corresponding process units 116, respectively. Specifically, the plurality of primary transfer rollers 73 are respectively provided at positions opposing the photosensitive drums of the corresponding process units 116 with the transfer belt interposed therebetween. The primary transfer roller comes into contact with the inner peripheral surface side of the transfer belt and displaces the transfer belt toward the photosensitive drum. Due to the displacement, the surface of the transfer belt comes into contact with the photosensitive drum. When the surface of the transfer belt comes into contact with the photosensitive drum, the toner image formed on the surface of the photosensitive drum is transferred to the surface of the transfer belt.

The secondary transfer roller is provided at a position opposing the secondary transfer counter roller. The secondary transfer roller comes into contact with the surface of the transfer belt to be conveyed on the peripheral surface of the secondary transfer counter roller, and applies pressure. The contact and pressure form a transfer nip in which the secondary transfer roller and the surface of the transfer belt are in close contact.

The secondary transfer roller and the secondary transfer counter roller rotate to convey the printing medium supplied from the paper feed cassette 101 or the manual feed tray 102 while nipping the printing medium. As a result, the printing medium passes through the transfer nip. The secondary transfer roller presses the printing medium passing through the transfer nip against the surface of the transfer belt. Here, when the toner image is transferred to the surface of the transfer belt, the toner image is transferred to the printing medium at the transfer nip.

The fixing unit 106 includes a heat roller and a pressure roller. The fixing unit 106 heats the printing medium that passed through the transfer nip at a predetermined temperature with the heat roller, and further pressurizes the printing medium with a pressure roller to fix the toner image transferred to the printing medium onto the printing medium.

The paper discharge roller 107 discharges the printing medium on which the toner image is fixed onto the relay unit 109 or the paper discharge tray 110.

The conveyance path switching gate 108 is a gate that allocates whether the printing medium discharged by the paper discharge roller 107 is delivered to the relay unit 109 or delivered to the paper discharge tray 110. When post-treatment is set for the printing medium, the conveyance path switching gate 108 operates to deliver the printing medium to the relay unit 109. When post-treatment is not set for the printing medium, the conveyance path switching gate 108 operates to deliver the printing medium to the paper discharge tray 110.

The relay unit 109 is a unit for conveying the printing medium allocated by the conveyance path switching gate 108 to the post-treatment device 60.

The paper discharge tray 110 is a tray that receives the printing medium allocated by the conveyance path switching gate 108.

The scanner 111 is a device that reads an image of a document and converts the image into image data. The scanner 111 may read the image of the document placed on the glass surface of a document table, or may read the image of the document sent to the glass surface of the document table by the automatic document feeding device 112. The automatic document feeding device 112 is a device that feeds documents placed on a document tray one by one to the glass surface of the document table.

The control panel 113 includes a display section and an operation section. The display section is a display device, such as a liquid crystal display, an organic electro luminescence (EL) display and the like. The display section displays various pieces of information related to the multifunction device 10. The operation section is an input device in which a plurality of keys or buttons are disposed. The operation section receives the operation of the user, and outputs a signal corresponding to the operation. The operation section may be a touch panel integrated with the display section.

The first reader/writer 114 and the second reader/writer 115 include an antenna. The first reader/writer 114 and the second reader/writer 115 have a function of reading data stored in the memory of the RFID tag 41 and a function of writing the data into the memory of the RFID tag 41, by short-range wireless communication in the non-contact state between the antenna and the RFID tag 41.

The first reader/writer 114 includes an antenna attached in the vicinity of the conveyance path for conveying the printing medium fed from the paper feed cassette 101 or the manual feed tray 102 to the image forming unit 103. When the tagged paper sheet 40 is fed from the paper feed cassette 101 or the manual feed tray 102, the first reader/writer 114 wirelessly communicates with the RFID tag 41 attached to the tagged paper sheet 40. The first reader/writer 114 reads the data of the RFID tag 41.

The second reader/writer 115 includes an antenna attached in the vicinity of the conveyance path for conveying the printing medium that passed through the fixing unit 106 to the conveyance path switching gate 108. The second reader/writer 115 wirelessly communicates with the RFID tag 41 of the tagged paper sheet 40 on which the toner image is fixed by the fixing unit 106. The second reader/writer 115 writes data into the RFID tag 41.

The post-treatment device 60 includes a housing 600. The housing 600 includes a paper discharge tray 601. The housing 600 accommodates a post-treatment section 602 for performing, for example, stapling, punching, saddle stitching, Z-folding, tri-folding, and the like. The post-treatment section 602 executes, for example, stapling, punching, saddle stitching, folding (Z-folding or tri-folding), and the like with respect to the printing medium supplied via the relay unit 109. The printing medium post-treated by the post-treatment section 602 is discharged to the paper discharge tray 601.

Figure 3:
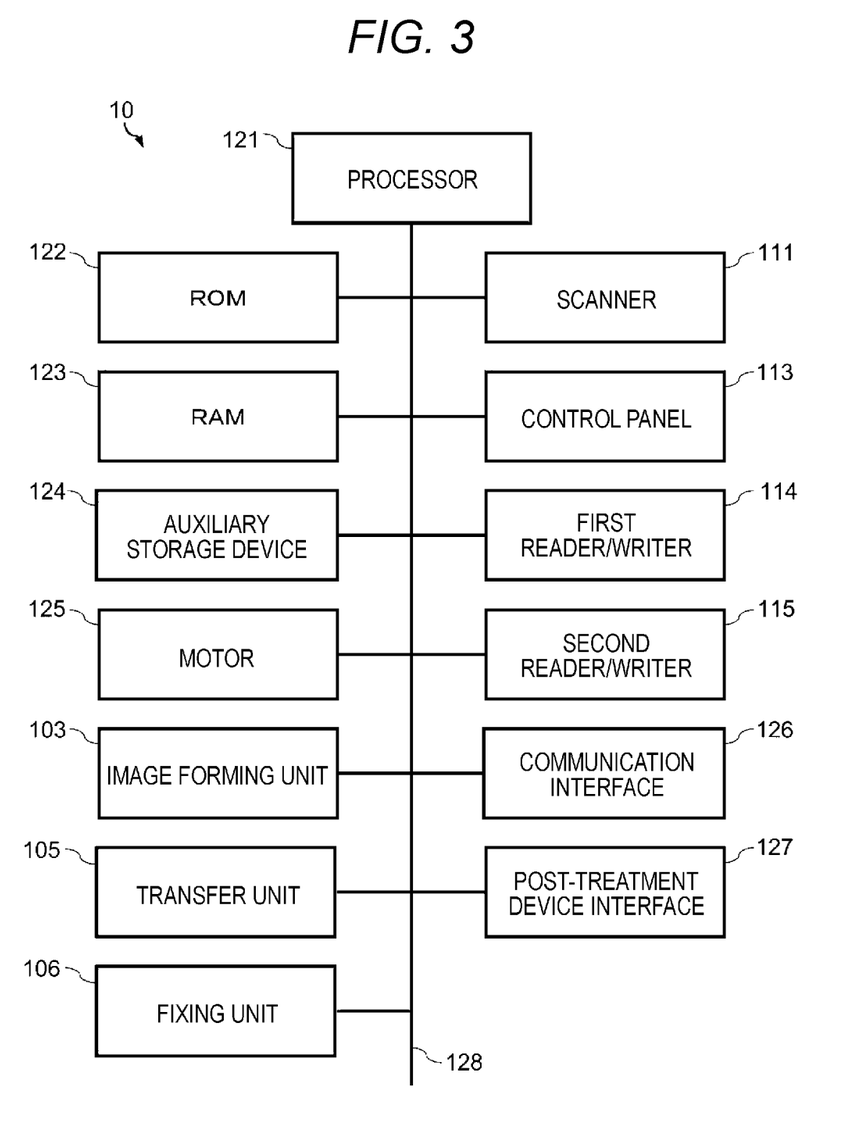
FIG. 3 is a block diagram illustrating a circuit configuration of the multifunction device, according to at least one embodiment.

FIG. 3 is a block diagram illustrating a circuit configuration of the multifunction device 10. In addition to the image forming unit 103, the transfer unit 105, the fixing unit 106, the scanner 111, the control panel 113, the first reader/ writer 114, the second reader/writer 115, and the like which are described using FIG. 2, the multifunction device 10 includes a processor 121, a read only memory (ROM) 122, a random access memory (RAM) 123, an auxiliary storage device 124, a motor 125, a communication interface 126, a post-treatment device interface 127, and a system bus 128. The system bus 128 includes an address bus, a data bus, and the like. In the multifunction device 10, the processor 121 and other sections are connected to each other by the system bus 128.

The processor 121 controls each section in order to perform various functions as the multifunction device 10 according to an operating system or an application program. The processor 121 is, for example, a central processing unit (CPU).

The ROM 122 and the RAM 123 function as the main memory of the processor 121. The ROM 122 is a non-volatile memory region. The ROM 122 stores the operating system or the application program. There is a case where the ROM 122 stores data necessary for the processor 121 to execute a process for controlling each section. The RAM 123 is a volatile memory region. The RAM 123 is used as a work area in which data is appropriately rewritten by the processor 121.

The auxiliary storage device 124 functions as an auxiliary storage device of the processor 121. As the auxiliary storage device 124, for example, well-known storage devices such as electric erasable programmable read-only memory (EEPROM), a hard disc drive (HDD) or a solid state drive (SSD) can be used alone or in combination of two or more. The auxiliary storage device 124 stores data used by the processor 121 for performing various processes and data generated by the processes of the processor 121. There is a case where the auxiliary storage device 124 stores the application program.

The motor 125 includes a first motor that drives a conveyance mechanism of the printing medium, a second motor that rotationally drives the photosensitive drum of the image forming unit 103, a third motor that rotationally drives the secondary transfer counter roller of the transfer unit 105, a fourth motor that drives a switching operation of the conveyance path switching gate 108, and the like. The processor 121 controls the driving of the first motor to control the conveyance and stop of the printing medium. The processor 121 controls the driving of the second motor and the third motor to control the image formation on the printing medium. The processor 121 controls the driving of the fourth motor to control the discharge destination of the printing medium on which the image is formed.

The communication interface 126 is a communication section that performs data communication with a host device, such as the server 20 connected to the communication network 30, according to a predetermined communication protocol. The multifunction device 10 can use the cloud service by performing the data communication with the server 20 via the communication interface 126. The multifunction device 10 acquires the data of each of the image file 21, the OCR file 22, and the RFID file 23 from the server 20 by using the cloud service.

The post-treatment device interface 127 is a communication section that performs data communication with the controller of the post-treatment device 60 mounted on the multifunction device 10. The multifunction device 10 controls post-treatment in the post-treatment device 60 by data communication via the post-treatment device interface 127.

Figure 4:
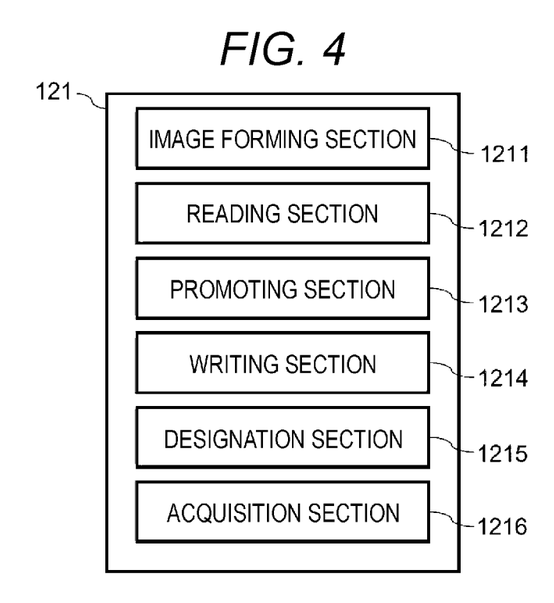
FIG. 4 is a block diagram illustrating a functional configuration implemented in a processor, according to at least one embodiment.

FIG. 4 is a block diagram illustrating a functional configuration implemented in the processor 121. The processor 121 has functions as an image forming section 1211, a reading section 1212, a promoting section 1213, a writing section 1214, a designation section 1215, and an acquisition section 1216.

The image forming section 1211 is a function of forming an image on a tagged paper sheet with a decolorable color material. The image forming section 1211 is a function performed by the processor 121 in cooperation with the image forming unit 103, the transfer unit 105, and the like.

The reading section 1212 is a function of reading the data of the RFID tag 41 attached to the tagged paper sheet 40 before the image is formed by the image forming section. The reading section 1212 is a function performed by the processor 121 in cooperation with the first reader/writer 114 and the like.

The promoting section 1213 is a function of promoting information related to the reuse of the tagged paper sheet 40 based on the data read from the RFID tag 41 before the image is formed on the tagged paper sheet 40. The reading section 1212 is a function performed by the processor 121 in cooperation with the display section and the like of the control panel 113.

The writing section 1214 is a function of writing data into the RFID tag attached to the tagged paper sheet 40. The writing section 1214 is a function performed by the processor 121 in cooperation with the second reader/writer 115 and the like.

The designation section 1215 is a function for designating information for acquiring the data of the image formed on the tagged paper sheet 40 and the data written into the RFID tag 41 attached to the tagged paper sheet 40, from the server 20 by using the cloud service. The designation section 1215 is a function performed by the processor 121 in cooperation with the display section, the operation section and the like of the control panel 113.

The acquisition section 1216 is a function of acquiring the data downloaded from the server 20 based on the information designated by the designation section 1215. The acquisition section 1216 is a function performed by the processor 121 in cooperation with the communication interface 126 and the like.

Figure 5:
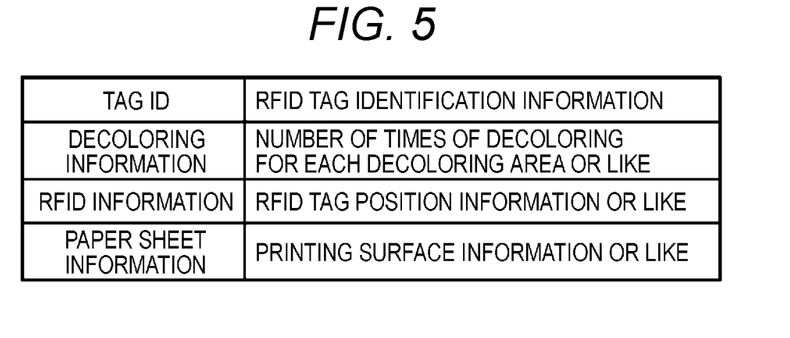
FIG. 5 is an explanatory view of data read from an RFID tag on a tagged paper sheet, according to at least one embodiment.

FIG. 5 is an explanatory view of data read from the RFID tag 41 of the tagged paper sheet 40 by the reading section 1212. As illustrated in FIG. 5, the data read from the RFID tag 41 includes a tag ID, decoloring information, RFID information, and paper sheet information.

The tag ID is unique identification information assigned to the RFID tag 41. The tag ID is set in the memory of the RFID tag 41 and is not rewritten in principle.

The decoloring information includes information correlated with an area subjected to be decolored on the tagged paper sheet 40 to which the RFID tag 41 is attached and the number of decoloring times for the area. The decoloring information is stored in the memory of the RFID tag 41 and is rewritten by the reader/writer provided in the decoloring device 50. The decoloring device 50 reads the decoloring information from the RFID tag 41 attached to the tagged paper sheet 40 to be decolored. The decoloring device 50 confirms whether the area of the decoloring information overlaps with the area to be decolored this time. In an overlapping case, the decoloring device 50 controls the reader/writer to add the number of decoloring times corresponding to the area by "1". In a non-overlapping case, the decoloring device 50 controls the reader/writer to write the data correlated with the new area and the number of decoloring times "1", into the RFID tag 41.

The RFID information includes positional information indicating the position of the RFID tag 41 attached to the tagged paper sheet 40. The positional information is represented by X-Y coordinates with any one point on one surface of the tagged paper sheet 40 as an original point. The RFID information is stored in the memory of the RFID tag 41.

The paper sheet information includes print surface information indicating whether the tagged paper sheet 40 corresponds to one-side printing or corresponds to both-side printing. In a case of the tagged paper sheet 40, there is a paper sheet that prohibits printing on the surface to which the RFID tag 41 is attached and a paper sheet that does not prohibit the printing. In the RFID tag 41 of the tagged paper sheet 40 that prohibits the printing on the surface to which the RFID tag 41 is attached, information indicating that the print surface information corresponds to the one-side printing is stored in the memory. In the RFID tag 41 of the tagged paper sheet 40 that does not prohibit the printing on the surface to which the RFID tag 41 is attached, information indicating that the print surface information corresponds to the both-side printing is stored in the memory.

Figure 6:
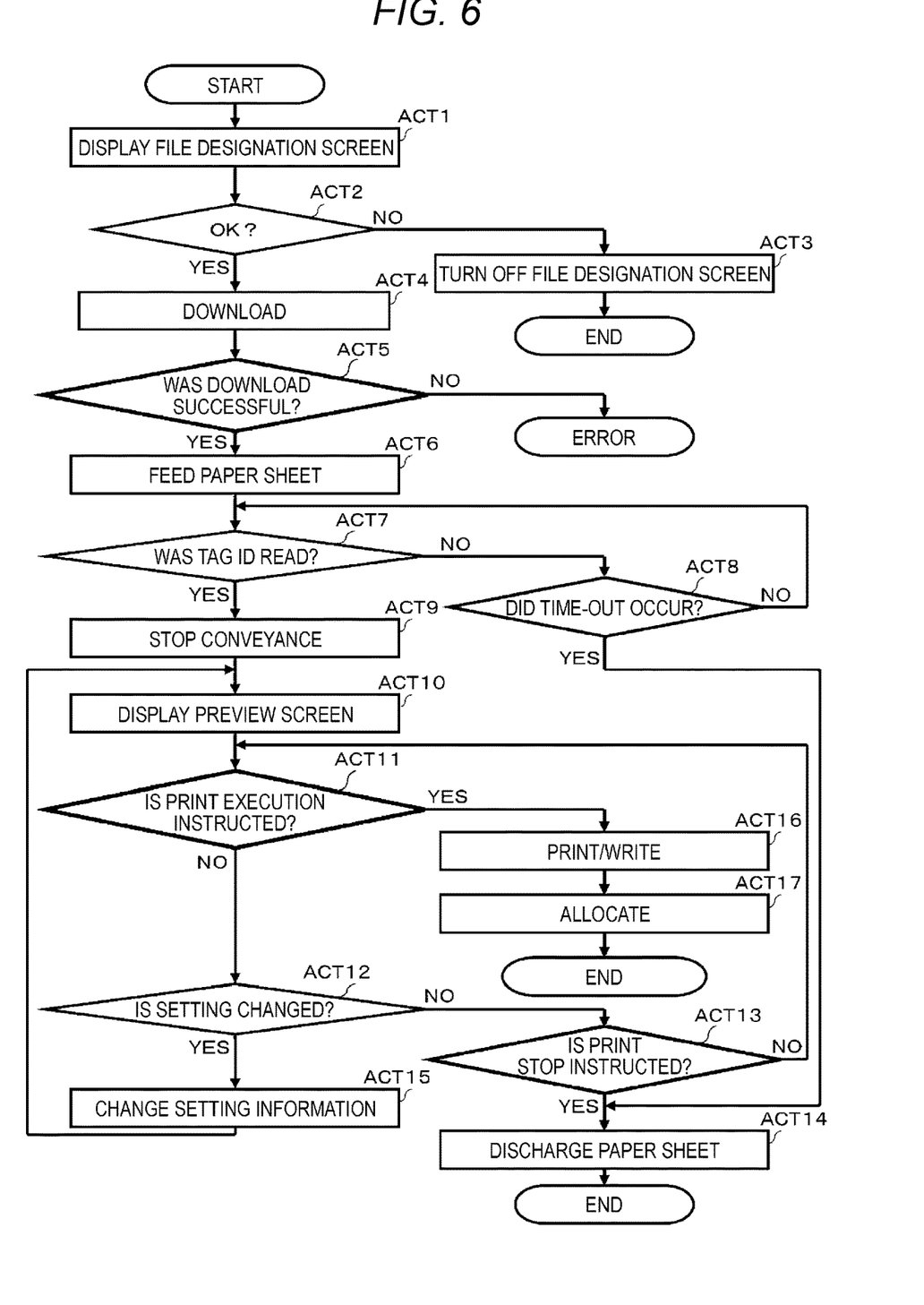
FIG. 6 is a flowchart describing a main information processing procedure executed by the processor according to a control program, according to at least one embodiment.

FIG. 6 is a flowchart illustrating a main information processing procedure executed by the processor 121 according to a control program. Specifically, the flowchart illustrates a procedure of printing the image of the image file 21 on the tagged paper sheet 40 using the decolorable toner, writing the data of the OCR file 22 and the RFID file 23 into the RFID tag 41 attached to the tagged paper sheet 40, and performing the post-treatment. By performing the information processing with such procedure, the processor 121 has functions as the image forming section 1211, the reading section 1212, the promoting section 1213, the writing section 1214, the designation section 1215, and the acquisition section 1216. The procedure illustrated below is an example. When the processor 121 can obtain the same function, the procedure can be changed as appropriate.

First, the user operates the operation section of the control panel 113 to select the print mode for the tagged paper sheet 40. When the print mode is selected, the processor 121 starts information processing of the procedure illustrated in the flowchart of FIG. 6.

Figure 7:
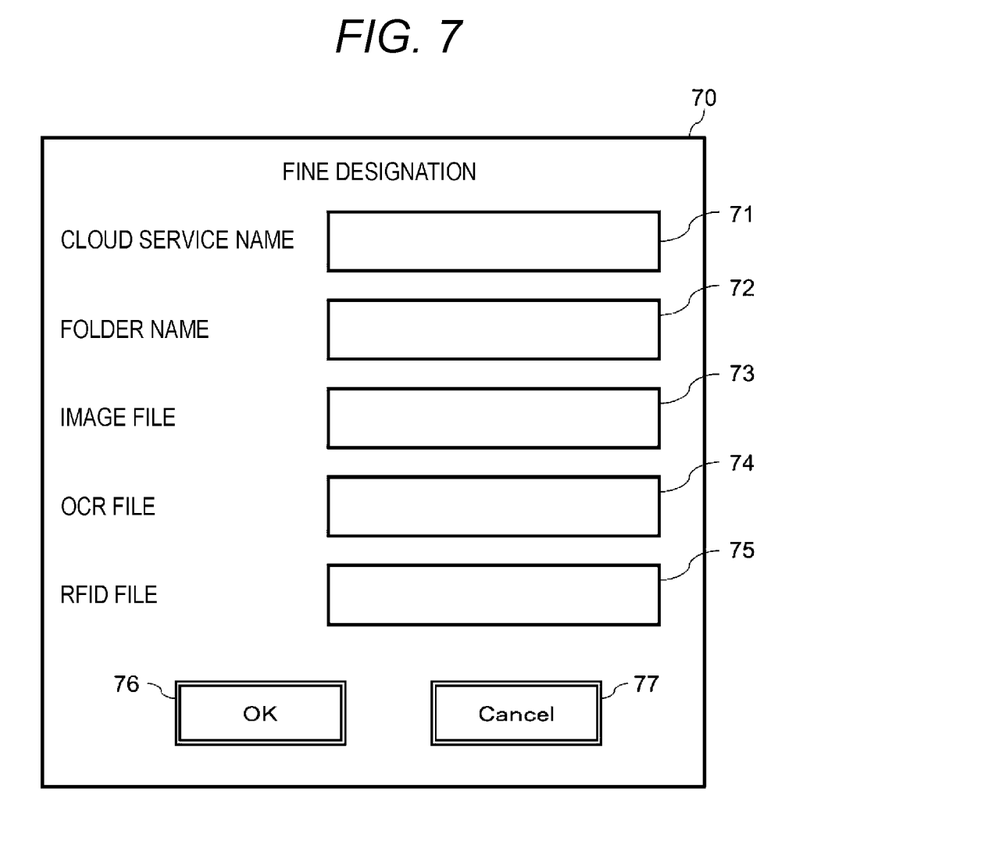
FIG. 7 is a display example of a file designation screen, according to at least one embodiment.

The processor 121 causes a file designation screen 70 to be displayed on the display section of the control panel 113, as ACT 1. The file designation screen 70 is a screen for designating the image file 21, the OCR file 22, and the RFID file 23 which are provided by the cloud service.

FIG. 7 is a display example of the file designation screen 70. As illustrated in FIG. 7, the file designation screen 70 includes a cloud service name input region 71, a folder name input region 72, an input region 73 of the image file 21, an input region 74 of the OCR file 22, an input region 75 of the RFID file 23, an operation region of an OK button 76, and an operation region of a Cancel button 77.

The user who confirmed the file designation screen 70 operates the operation section, inputs the cloud service name into the input region 71, inputs the folder name into the input region 72, and inputs the image file name into the input region 73. The cloud service name is the name of the cloud service managed by the server 20. The folder name is the name of the folder used in the cloud service. The image file name is the name of the image file 21 that stores the image data to be printed on the tagged paper sheet 40.

When the image file name is input into the input region 73, the default file name is displayed in the input region 74 and the input region 75. In other words, in the input region 74, the file name of the OCR file 22 that stores the digital data after character recognition process is performed with respect to the image data of the image file 21 specified by the image file name, is displayed. In the input region 75, the file name of the RFID file 23 that stores the data related to the same image data as the data written into the RFID tag, is displayed.

In general, the user uses the default file name of the OCR file 22 or the RFID file 23. When changing the file name of the OCR file 22 or the RFID file 23, the user rewrites the file name of the input region 74 or the input region 75. As such, when the information displayed in each of the input regions 71 to 75 is confirmed, the user operates the OK button 76. When canceling the operation on the file designation screen 70, the user operates the Cancel button 77.

The processor 121 that displayed the file designation screen 70 waits for the OK button 76 to be operated or the Cancel button 77 to be operated, as ACT 2. When the Cancel button 77 is operated, the processor 121 proceeds from ACT 2 to ACT 3. The processor 121 turns off the file designation screen 70 as ACT 3. With the above, the processor 121 ends the information processing of the procedure illustrated in FIG. 6.

When the OK button 76 is operated in ACT 2, the processor 121 proceeds from ACT 2 to ACT 4. The processor 121 requests the server 20 to download the image file 21, the OCR file 22, and the RFID file 23 based on the information of the file designation screen 70, as ACT 4. In response to the request, the server 20 acquires the image file 21, the OCR file 22, and the RFID file 23 with the file names designated by the file designation screen 70 from the database and downloads the files to the multifunction device 10. The processor 121 stores the image file 21, the OCR file 22, and the RFID file 23 downloaded from the server 20 in the RAM 123 or the auxiliary storage device 124.

The processor 121 confirms whether the image file 21, the OCR file 22, and the RFID file 23 are successfully downloaded as ACT 5. For example, when the download fails due to the occurrence of a communication network failure, the processor 121 notifies the download error and ends the information processing in the procedure illustrated in FIG. 6.

When the download is successful, the processor 121 proceeds from ACT 5 to ACT 6. The processor 121 starts feeding the tagged paper sheet 40 as ACT 6. For example, when the tagged paper sheet 40 is accommodated in the paper feed cassette 101 on the lowest stage, the processor 121 controls the first motor to pick up and convey one printing medium from the paper feed cassette 101 on the lowest stage.

According to the control, the printing medium is conveyed along the conveyance path. Here, when the printing medium is the tagged paper sheet 40, and when the RFID tag 41 attached to the tagged paper sheet 40 approaches the antenna installation location of the first reader/writer 114, the first reader/writer 114 reads the data of the RFID tag 41. On the other hand, when the printing medium is a plain paper sheet or the RFID tag 41 is broken, even when the printing medium approaches the antenna installation location of the first reader/writer 114, the first reader/writer 114 cannot read the data.

The processor 121 confirms whether the data of the RFID tag 41 is read by the first reader/writer 114, as ACT 7. When the data of the RFID tag 41 is not read, the processor 121 confirms whether time-out occurred as ACT 8. The processor 121 counts the elapsed time from the start of paper feeding. Regarding the elapsed time, when the time required for the paper sheet fed from the paper feed cassette 101 to pass through the antenna installation location of the first reader/writer 114 elapses, the time-out occurs.

When the time-out occurs, the processor 121 proceeds from ACT 8 to ACT 14. The processor 121 controls the printing medium as ACT 14 to discharge the printing medium to the paper discharge tray. By such control, the printing medium is discharged to the paper discharge tray 110. No image is formed on the printing medium. Therefore, in a case of a plain paper sheet, the reuse is possible. In a case of the tagged paper sheet 40, the user can recognize that the RFID tag 41 is broken.

When the data of the RFID tag 41 is read by the first reader/writer 114, the processor 121 proceeds from ACT 7 to ACT 9. The processor 121 temporarily stops the conveyance of the printing medium, that is, the tagged paper sheet 40, as ACT 9. The processor 121 displays a preview screen on the display section of the control panel 113 as ACT 10. The preview screen is configured with a first preview screen 80 and a second preview screen 90. The first preview screen 80 and the second preview screen 90 are displayed in parallel on the display section. Otherwise, the first preview screen 80 and the second preview screen 90 may be alternately displayed on the display section.

Figure 8:
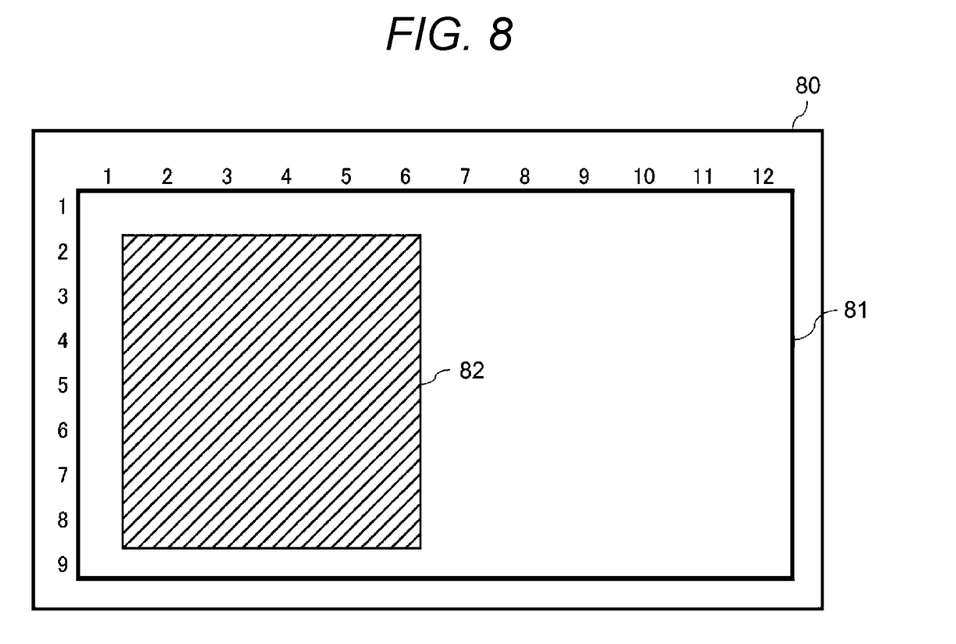
FIG. 8 is a display example of a first preview screen, according to at least one embodiment.

FIG. 8 is a display example of the first preview screen 80. The first preview screen 80 is a screen representing the result of printing an image 82 with the image data of the downloaded image file 21, on a print surface 81 of the tagged paper sheet 40. The user can confirm the printing position of the image 82 on the fed tagged paper sheet 40, on the first preview screen 80.

Figure 9:
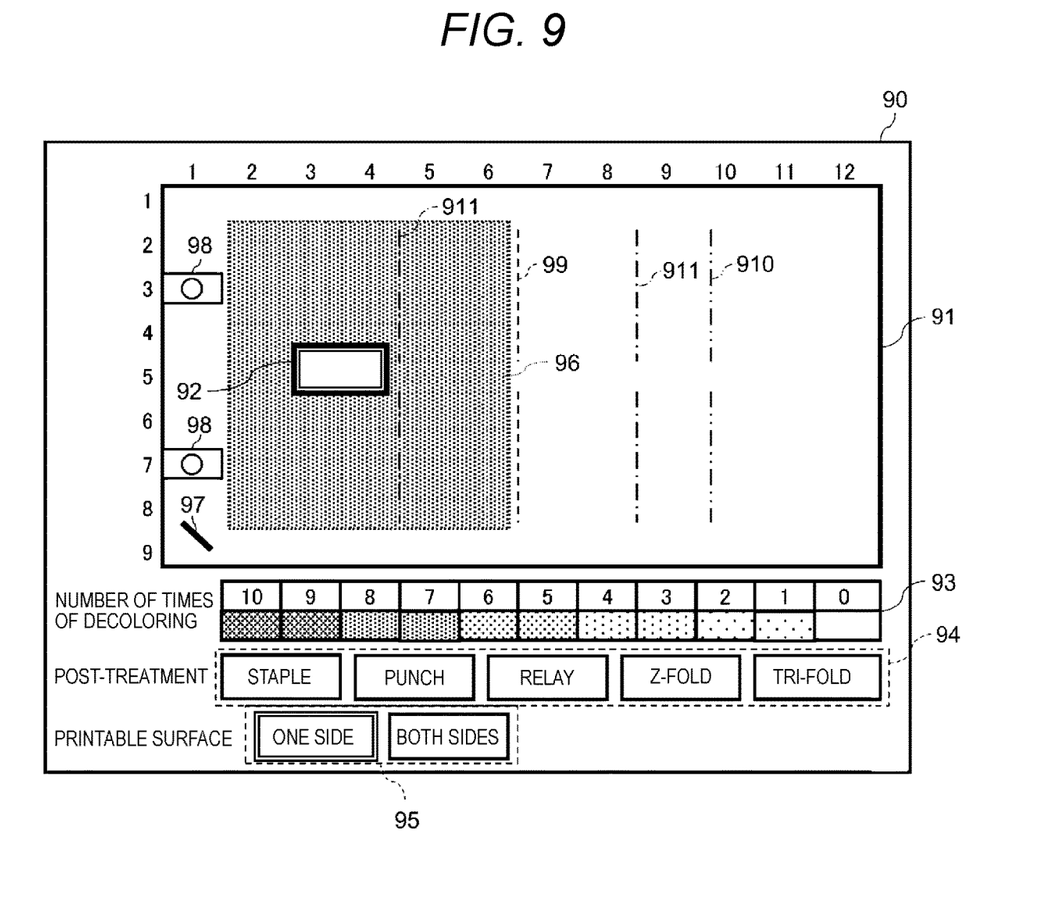
FIG. 9 is a display example of a second preview screen, according to at least one embodiment.

FIG. 9 is a display example of the second preview screen 90. The second preview screen 90 is a screen on which a print surface 91 of the tagged paper sheet 40 and a position 92 of the RFID tag 41 attached to the paper sheet are displayed. The position 92 of the RFID tag 41 is edited by the processor 121 based on the RFID information read from the RFID tag 41.

The second preview screen 90 includes a display section 93 for the number of decoloring times, a selection section 94 for the post-treatment, and a display section 95 for a printable surface.

The display section 93 for the number of decoloring times represents the number of decoloring times from 0 to 10 by a gradation that gradually becomes darker as the number of times increases. On the print surface 91, a region 96 decolored in the past is displayed, and the background color of the region 96 is a gradation corresponding to the number of decoloring times. The region 96 to which the decoloring is performed and the gradation indicating the number of decoloring times of the region are edited by the processor 121 based on the decoloring information read from the RFID tag 41. In at least one embodiment, a case where the upper limit of the number of decoloring times is 10 is illustrated.

The selection section 94 for the post-treatment disposes buttons for selecting each post-treatment item such as stapling, punching, saddle stitching, Z-folding, and tri-folding. On the print surface 91, a position 97 stapled by the stapling, a position 98 where the punched hole is punched by the punching, a position 99 of the folding line when being saddle-stitched by the saddle stitching, a position 910 of the folding line when being Z-folded by the Z-folding, and a position 911 of the folding line when being tri-folded by the tri-folding, are displayed.

The display section 95 of the printable surface indicates whether the tagged paper sheet 40 corresponds to the one-side printing or corresponds to the both-side printing. The display section 95 is edited by the processor 121 based on the paper sheet information read from the RFID tag 41.

The user can confirm the decolored region 96 and the number of decoloring times of the fed tagged paper sheet 40, on the second preview screen 90. For example, when the image 82 is printed in the decolored region 96, which has a large number of decoloring times, the user operates the control panel 113 to change the setting information such that the printing position of the image 82 does not overlap with the decolored region 96.

The user can confirm the position of the post-treatment with respect to the fed tagged paper sheet 40, on the second preview screen 90. For example, when the user desires to perform the tri-folding with respect to the tagged paper sheet 40, the user confirms whether the position 911 of the folding line overlaps with the position 92 of the RFID tag 41. When the position 911 of the folding line overlaps with the position 92 of the RFID tag 41, it is not possible to perform the tri-folding with respect to the tagged paper sheet 40. The user determines whether the saddle stitching or the Z-folding is possible based on the position 99 of the folding line or the position 910 of the folding line and the position 92 of the RFID tag 41. For example, when the Z-folding is possible, the user selects the post-treatment item "Z-fold" of the selection section 94.

The user confirms the printable surface of the fed tagged paper sheet 40 on the second preview screen 90. For example, when both-side printing is set as the printing method and the printable surface is one side, the user operates the control panel 113 to change the printing method setting to one-side printing. Otherwise, the user operates the control panel 113 to instruct print stop.

The user looks at the first preview screen 80 and the second preview screen 90, and when the printing position adjustment of the image 82, the item selection of the post-treatment, the setting of the printing method, and the like are completed, the user instructs the printing execution.

The processor 121 that displays the preview screen confirms whether the print execution is instructed, as ACT 11. When the print execution is not instructed, the processor 121 confirms whether the setting change is instructed, as ACT 12. When the setting change is not instructed, the processor 121 confirms whether the print stop is instructed, as ACT 13. When the print stop is not instructed, the processor 121 returns from ACT 13 to ACT 11. Here, the processor 121 waits in ACT 11 to ACT 13 for the print execution instruction, the setting change instruction, or the print stop instruction.

When the print stop is instructed, the processor 121 returns from ACT 13 to ACT 14. The processor 121 controls the printing medium as ACT 14 to discharge the printing medium to the paper discharge tray. By such control, the printing medium, that is, the tagged paper sheet 40 is discharged to the paper discharge tray 110. No image is formed on the tagged paper sheet 40, and the RFID tag 41 is not broken. Therefore, the tagged paper sheet 40 can be reused.

When the setting change is instructed, the processor 121 returns from ACT 12 to ACT 15. The processor 121 changes the setting information as ACT 12. For example, when the printing position of the image 82 is adjusted, the processor 121 changes the printing position of the image 82 to the adjusted position. For example, when the Z-folding is selected as the post-treatment, the processor 121 controls the post-treatment device 60 such that the post-treatment device 60 executes the Z-folding. As such, the processor 121 that changed the setting information returns to ACT 9. The processor 121 updates the first preview screen 80 and the second preview screen 90 based on the changed setting information.

When the print execution is instructed, the processor 121 proceeds from ACT 11 to ACT 16. The processor 121 resumes the conveyance of the tagged paper sheet 40 as ACT 16. The processor 121 controls the second motor and the third motor, operates the image forming unit 103, the transfer unit 105, and the fixing unit 106, and prints the image of the image file 21 on the print surface of the tagged paper sheet 40. The processor 121 controls the second reader/writer 115 to write the data of the OCR file 22 and the data of the RFID file 23 into the RFID tag 41 of the tagged paper sheet 40.

The processor 121 controls the fourth motor as ACT 17 to operate the conveyance path switching gate 108, thereby allocating the discharge destination of the tagged paper sheet 40. Specifically, when the post-treatment is set for the tagged paper sheet 40, the conveyance path switching gate 108 is operated such that the tagged paper sheet 40 is discharged to the relay unit 109. When the post-treatment is not set for the tagged paper sheet 40, the conveyance path switching gate 108 is operated such that the tagged paper sheet 40 is discharged to the paper discharge tray 110. With the above, the processor 121 ends the information processing of the procedure illustrated in the flowchart of FIG. 6.

Incidentally, the tagged paper sheet 40 discharged to the relay unit 109 is sent to the post-treatment device 60. After the post-treatment such as the Z-folding is performed, the paper sheet is discharged from a paper discharge tray 501.

Both the images printed on the tagged paper sheet 40 discharged to the paper discharge tray 501 of the post-treatment device 60 and the tagged paper sheet 40 discharged to the paper discharge tray 110 of the multifunction device 10 are images printed with decolorable toner. Therefore, the tagged paper sheet 40 can be reused by erasing the image from the tagged paper sheet 40 by the decoloring device 50.

According to at least one embodiment, the multifunction device 10 reads the data of the RFID tag 41 attached to the tagged paper sheet 40 before forming an image with a decolorable color material by the image forming section 1211, by the reading section 1212. The multifunction device 10 promotes information related to the reuse of the tagged paper sheet 40 based on the data read from the RFID tag 41 by the promoting section 1213 before the image is formed on the tagged paper sheet 40.

For example, the promoting section 1213 promotes a region in which the image formed with a decolorable color material is erased and the number of erasing times with respect to the region. Therefore, the user adjusts the print start position such that the image is formed in the region where the number of decoloring times is small before the image is formed on the tagged paper sheet 40. By doing so, it is possible to prevent the print quality from deteriorating due to the formation of the image in the region where the number of erasing times is large. As a result, when reusing the tagged paper sheet 40, which is more expensive than a plain paper sheet, the probability that the paper sheet is wasted due to low quality of printing can be reduced.

For example, the promoting section 1213 further promotes a surface capable of forming an image of the tagged paper sheet 40. Therefore, the user sets the printing method such that the image is not formed on the surface on which the image cannot be formed before the image is formed on the tagged paper sheet 40. By doing so, it is possible to prevent an image from being formed on a surface on which image formation is not possible. As a result, when reusing the tagged paper sheet 40, which is more expensive than a plain paper sheet, the probability that the paper sheet is wasted due to printing errors can be reduced.

For example, the promoting section 1213 further promotes the position of the RFID tag 41 attached to the tagged paper sheet 40. Therefore, the user adjusts the print start position such that the image does not overlap with the RFID tag 41 before the image is formed on the tagged paper sheet 40. Otherwise, the user selects the folding in which the folding line does not come to the position of the RFID tag 41 when the folding is performed by the post-treatment device 60. By doing so, it is possible to prevent the quality of the image formed at the position of the RFID tag 41 from deteriorating and the RFID tag from being destroyed by the folding. As a result, when reusing the tagged paper sheet 40, which is more expensive than a plain paper sheet, the probability that the paper sheet is wasted due to low quality of printing or damage of the RFID tag 41 can be reduced.

For example, the promoting section 1213 further promotes the position where the post-treatment is performed with respect to the tagged paper sheet 40. Therefore, it is possible to reliably prevent the RFID tag 41 from being destroyed by the post-treatment such as the stapling, the punching, and the folding. As a result, when reusing the tagged paper sheet 40, which is more expensive than a plain paper sheet, the probability that the paper sheet is wasted due to damage of the RFID tag 41 can further be reduced.

The multifunction device 10 further includes a writing section for writing data into the RFID tag 41 attached to the tagged paper sheet 40. Therefore, it is possible to provide the multifunction device 10 in which not only the information to be viewed can be printed on the tagged paper sheet 40 as an image, but also the information that should not be viewed can be written into the RFID tag 41 attached to the tagged paper sheet 40 as digital data.

The multifunction device 10 includes the communication interface 126 that communicates with the server 20 that provides the cloud service. The multifunction device 10 includes the designation section 1215 that designates information for acquiring the data of the image formed on the tagged paper sheet 40 and the data written into the RFID tag 41 attached to the tagged paper sheet 40, from the server 20 by using the cloud service. Therefore, it is possible to manage the data of the image formed on the tagged paper sheet 40 and the data written into the RFID tag 41 attached to the tagged paper sheet 40, by the cloud service. Specifically, the server 20 can manage the data of the image file 21, the OCR file 22, and the RFID file 23. As a result, the multifunction device 10 can easily correspond to a flexible operation using the cloud service.

The multifunction device 10 includes the acquisition section 1216 that acquires the data downloaded from the server 20 based on the information designated by the designation section 1215. Therefore, the multifunction device 10 can acquire the data managed by the server 20 online by using the cloud service.

Finally, online shopping will be described as a suitable application example of the multifunction device 10.

When receiving an order for a merchandise from a consumer online, a merchandise sales site that operates online shopping creates the image file 21, the OCR file 22, and the RFID file 23 of an order slip based on the order contents. The created data of the image file 21, the OCR file 22, and the RFID file 23 are managed by the server 20.

The person in charge of the merchandise sales site notifies the person in charge of the merchandise shipping site that the order was placed. When receiving the notification, the person in charge of the merchandise shipping site creates an order slip using the multifunction device 10. First, the person in charge selects the print mode for the tagged paper sheet 40. Then, since the file designation screen 70 is displayed on the display section of the control panel 113, the person in charge inputs the cloud service name, the folder name, and the image file name, and operates the OK button 76. Accordingly, the image file 21, the OCR file 22, and the RFID file 23 of the order slip are downloaded from the server 20 to the multifunction device 10.

When the download is successful, the multifunction device 10 starts feeding the tagged paper sheet 40. The data of the RFID tag 41 attached to the tagged paper sheet 40 is read by the first reader/writer 114. As a result, the first preview screen 80 and the second preview screen 90 are displayed on the display section of the control panel 113.

The person in charge confirms the display contents of the first preview screen 80 and the second preview screen 90, and instructs the printing execution when there is no problem in printing the order slip by the tagged paper sheet 40. Accordingly, in the multifunction device 10, the image of the image file 21 is printed, and the tagged paper sheet 40 in which the data of the OCR file 22 and the data of the RFID file are written into the RFID tag 41 is dispensed as an order slip.

The person in charge prepares the ordered merchandise according to the order slip. Here, the person in charge prepares the merchandise based on the information printed on the order slip. Otherwise, the person in charge may read the data of the RFID tag 41 attached to the order slip with a reader/writer and prepare a merchandise based on the data.

The person in charge ships the prepared merchandise. After the shipment is completed, the order slip is no longer needed, and thus, the person in charge erases the image printed on the order slip using the decoloring device 50. By erasing the image, the tagged paper sheet 40 can be reused.

Although at least one embodiment of the image forming apparatus was described above, the embodiment is not limited thereto.

The image forming apparatus is not limited to the multifunction device 10. The image forming apparatus may be a copying machine, a printer, a facsimile apparatus, or the like. The image forming apparatus may be an ink jet printer using a decoloring ink as a decolorable color material. In a printer, a facsimile machine, an ink jet printer, or the like, when the post-treatment device cannot be attached, the post-treatment selection section 94 is omitted from the second preview screen 90.

In at least one embodiment, a case where the RFID tag 41 stores the decoloring information, the RFID information, and the paper sheet information is illustrated. In another embodiment, a data table in which the decoloring information, the RFID information, and the paper sheet information are set is generated correlating with the tag ID of the RFID tag 41 attached to the tagged paper sheet 40. The data table is stored in the auxiliary storage device 124 of the multifunction device 10. When the tag ID of the RFID tag 41 is read by the first reader/writer 114, the processor 121 searches for the data table and acquires the decoloring information, the RFID information, and the paper sheet information correlated with the tag ID. By adopting such a configuration, the RFID tag 41 may not store the decoloring information, the RFID information, and the paper sheet information. The data table may be stored in the storage device of the server 20 instead of the auxiliary storage device 124 of the multifunction device 10. Otherwise, the data table may be a storage device of an external device other than the server.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
a processor configured to cause:
displaying a number of decoloring times representing the number of decoloring times from 0 to 10 by a gradation that gradually becomes darker as the number of times increases;
wherein the gradation indicates the number of decoloring times of the region are edited by the processor based on a decoloring information read from an RFID tag;
forming an image with a decolorable color material on a tagged paper sheet with the RFID tag;
reading data of the RFID tag attached to the tagged paper sheet before the image is formed;
and promoting information related to reuse of the tagged paper sheet based on the data read from the RFID tag before forming the image on the tagged paper sheet.

2. The apparatus of claim 1, wherein the processor is further configured to cause promoting a region in which an image formed with the decolorable color material is erased and a number of erasing times with respect to the region.

3. The apparatus of claim 2, wherein the processor is further configured to cause promoting a surface on which an image of the tagged paper sheet is capable of being formed.

4. The apparatus of claim 2, wherein the processor is further configured to cause promoting a position of the RFID tag attached to the tagged paper sheet.

5. The apparatus of claim 4, wherein the processor is further configured to cause promoting a position where post-treatment is performed with respect to the tagged paper sheet.

6. The apparatus of claim 5, wherein
the post-treatment is at least one of stapling, punching, or folding, wherein for stapling, a position to be stapled is promoted on the tagged paper sheet together with the position of the RFID tag, wherein for punching, a position where a punched hole is punched is promoted on the tagged paper sheet together with the position of the RFID tag, and wherein for folding, a position to be folded by the folding is promoted on the tagged paper sheet together with the position of the RFID tag.

7. The apparatus of claim 1, wherein the processor is further configured to cause writing the data into the RFID tag attached to the tagged paper sheet.

8. The apparatus of claim 7, wherein the processor is further configured to cause:
communicating with a cloud server; and
designating information for acquiring data of the image formed on the tagged paper sheet and the data written into the RFID tag attached to the tagged paper sheet, from the cloud server.

9. The apparatus of claim 8, wherein the processor is further configured to cause:

acquiring data downloaded from the cloud server based on information designated;

forming an image with the decolorable color material on the tagged paper sheet based on the data of the image acquired; and writing the data to be written into the RFID tag into the RFID tag of the tagged paper sheet.

10. An image forming apparatus comprising:

a processor configured to cause forming an image with a decolorable color material on a tagged paper sheet with an RFID tag;

a first reader/writer configured to read data of the RFID tag attached to the tagged paper sheet before the image is formed;

a display configured to display information related to reuse of the tagged paper sheet based on the data read from the RFID tag before the image is formed on the tagged paper sheet;

wherein the display is configured to display a number of decoloring times representing the number of decoloring times from 0 to 10 by a gradation that gradually becomes darker as the number of times increases;

wherein the gradation indicates the number of decoloring times of the region are edited by the processor based on a decoloring information read from the RFID tag;

and a second reader/writer configured to write the data of the RFID tag attached to the tagged paper sheet.

11. The apparatus of claim 10, wherein the first reader/writer and the second reader/writer each comprise an antenna configure to facilitate reading the data and writing the data, respectively, by short-range wireless communication between the antenna and the RFID tag.

12. The apparatus of claim 11, wherein the antenna of the first reader/writer is disposed adjacent to a conveyance path for conveying the tagged paper sheet from a paper feed cassette or a manual feed tray to an image forming device.

13. The apparatus of claim 11, wherein the antenna of the second reader/writer is disposed adjacent to a conveyance path for conveying the tagged paper sheet that passed through a fixing device to a conveyance path switching gate.

14. The apparatus of claim 10, wherein the display is further configured to indicate whether the tagged paper sheet corresponds to a one-side printing or corresponds to a both-side printing.

15. A method of operating an image forming apparatus, the method comprising:

displaying a number of decoloring times representing the number of decoloring times from 0 to 10 by a gradation that gradually becomes darker as the number of times increases;

wherein the gradation indicates the number of decoloring times of the region are edited by the processor based on a decoloring information read from an RFID tag;

forming an image with a decolorable color material on a tagged paper sheet with an RFID tag;

reading data of the RFID tag attached to the tagged paper sheet before the image is formed;

and promoting information related to reuse of the tagged paper sheet based on the data read from the RFID tag before the image is formed on the tagged paper sheet.

16. The method of claim 15, further comprising promoting a region in which an image formed with the decolorable color material is erased and a number of erasing times with respect to the region.

17. The method of claim 16, further comprising:

promoting a surface on which an image of the tagged paper sheet is capable of being formed;

promoting a position of the RFID tag attached to the tagged paper sheet; and promoting a position where post-treatment is performed with respect to the tagged paper sheet.

18. The method of claim 15, further comprising writing the data into the RFID tag attached to the tagged paper sheet.

19. The method of claim 18, further comprising:

communicating, by the image forming apparatus, with a cloud server; and designating information for acquiring data of the image formed on the tagged paper sheet and data written into the RFID tag attached to the tagged paper sheet, from the server.

20. The method of claim 19, further comprising:

acquiring data downloaded from the server based on information designated;

forming an image with the decolorable color material on the tagged paper sheet based on the data of the image acquired; and writing the data to be written into the RFID tag of the tagged paper sheet.

* * * * *